N. Silverthorn.

Shoe Tip.

No 3.070.

Reissued Aug. 4. 1868.

Witnesses:

C. F. Wesson

A. O. Snyder

Inventor:

Nurman Schrothorn

UNITED STATES PATENT OFFICE.

THE AMERICAN SHOE TIP COMPANY OF CONNECTICUT, ASSIGNEES, BY MESNE ASSIGNMENTS, OF NEWMAN SILVERTHORN.

IMPROVED BOOT AND SHOE TIP.

Specification forming part of Letters Patent No. 26,239, dated November 29, 1859; reissue No. 1,339, dated September 2, 1862; reissue No. 3,070, dated August 4, 1868.

*To all whom it may concern:*

Be it known that NEWMAN SILVERTHORN, of Prescott, in the county of Pierce and State of Wisconsin, has invented a new article of manufacture, viz, a tip applicable to boots and shoes, for the protection of the toe part of the same; and it is hereby declared that the following is a full, clear, and exact description of the same, reference being had to the accompanying drawing.

In boots and shoes, particularly those designed for children's wear, and for the wear of farm-laborers or other persons whose occupation requires them often to walk over soil growing certain grasses whose blades are stiff and cutting, as those of most of the western prairies, it has been found necessary to protect the toe portion of the boot or shoe by means of a tip, made of leather, metal, india-rubber, or other substance capable of resisting wear in a more or less perfect manner.

Tips, as heretofore, were made together with and while making the boot or shoe to which they were applied, and in which case the tip was generally cut of leather and formed in the act of making the shoe or boot, an operation both difficult and expensive—and consequently impracticable for manufacturing purposes.

The object of this invention is to avoid the objections above referred to, and to produce a tip formed of suitable material and shaped in such a manner that it can be readily applied to the boot or shoe in a permanent manner without loss of time and without necessitating a separate operation, such tip making a neat finish and being more durable than tips as heretofore made while the shoe is being made, protects that part of the shoe that is most liable to be worn out, and altogether makes a better and cheaper tipped shoe.

And this invention consists in the production, as an article of manufacture, of a tip formed into shape in such a manner as to allow of its being applied and fastened to the toe part of shoes or boots by sewing or pegging, substantially as hereinafter described and for the purposes set forth.

To enable others skilled in the art to make and use this invention, we shall now proceed to describe it particularly, and the manner in which the same is or may be carried into effect, referring to the accompanying drawing, in which—

Figure 1:
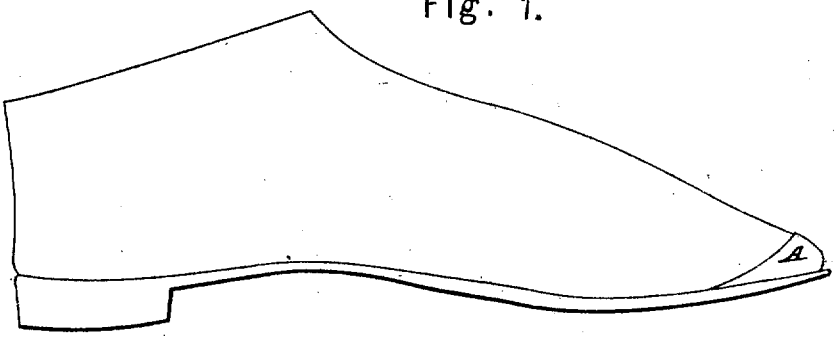
Figure 2:
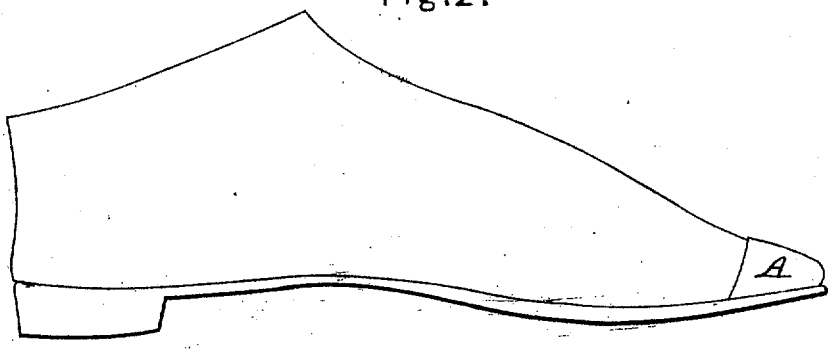
Figure 3:
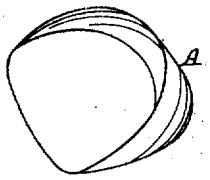
Figure 4:
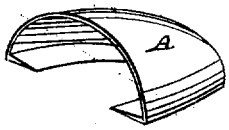

Figures 1 and 2 represent shoes with tips upon them, and Figs. 3 and 4 tips separate from shoes.

As no claim is made to the peculiar mode or manner of producing the tip, and which must necessarily vary according to the nature of the material it is made of, and which is well known to those acquainted with special arts of working metal, india-rubber, &c., we shall confine ourselves to the description of that part of the invention which is new, and whereby it may be distinguished from all other inventions.

The tip, marked A in the drawing, is generally of the form of the toe part of the shoe to which it is to be applied; its upper edge may be rounded off in the crescent fashion or to bulge out in the middle, or formed square or otherwise, so as to produce a symmetrical and pleasing appearance to the shoe when applied.

The tip thus formed is provided with a base-plate or flange connected, or made in one piece with the tip. The base need not extend throughout the whole length or width of the sole, as a mere flange sufficiently wide to come within the row of stitches or pegs whereby it is secured, together with the upper, to the sole is quite sufficient.

It will be obvious that such tips, if made of metal, may be "struck off" or "up" by means of the ordinary bed and die devices, and if made of rubber or gutta-percha, it may be formed before vulcanization, *i. e.*, when still in plastic condition, upon molds, and may be cured or vulcanized afterwards.

The mode of applying the tips to boots and shoes may be as follows: The boot or shoe is first "lasted," the outer sole is then applied and sewed or pegged to the upper, leaving the toe portion disunited for the placing of the tip by inserting its base between the upper and the sole. The three, viz, the upper, tip-base, and sole, are then sewed together or pegged together, as the case may be.

For some kind of pegged work we prefer to use tips made of hard rubber, metal, or some other substance which affords greater strength and durability than leather or other substance of which the shoe or boot to which the tip is to be applied is made, and which can be readily fashioned into requisite and permanent shape.

The hard-rubber or metal tip, however, is mainly applicable to pegged work, *i. e.*, to boots or shoes in which the sole is united to the upper by means of pegs or nails, and is not suitable for practical purposes for sewed work. This objection does not apply to tips made of an india-rubber or gutta-percha compound that when vulcanized is soft and flexible; such tips, besides being easily made and fashioned into an unalterable form, are softer to the toe, impervious to dampness, and may be securely held by stitching them to their place in boots or shoes, which have their soles united to the uppers by sewing.

Another and important advantage of the soft and elastic india-rubber tip is, that dirt and dust and mud that usually gather and fill the space between the tip and the toe may be easily removed by simply turning the tip over, the elasticity of the material bringing it back to its original position. By this means the toe is kept clean and prevented from rotting.

Having thus described the invention, it may be observed that the claim of invention is not confined to the particular material of which the tip is or may be made, nor yet to the manner or process by which the same is or may be produced or applied; but

What is claimed as the invention of the said Newman Silverthorn is—

A formed tip, substantially as described, as an article of manufacture.

In testimony whereof we, H. M. BEARCE, treasurer, and A. VAN WAGENEN, secretary, of the AMERICAN SHOE TIP COMPANY, acting for and in behalf of said company, have hereunto set our hands before two subscribing witnesses.

H. M. BEARCE.
A. VAN WAGENEN.

Witnesses:
A. POLLOK,
EDM. F. BROWN.